Patented Sept. 20, 1932

1,877,961

UNITED STATES PATENT OFFICE

ERNST POKORNY, OF LEIPZIG, GERMANY, ASSIGNOR TO I. G. FARBENINDUSTRIE AKTIENGESELLSCHAFT, OF FRANKFORT-ON-THE-MAIN, GERMANY

PROCESS FOR THE PRODUCTION OF TUNGSTEN METAL

No Drawing. Application filed December 18, 1930, Serial No. 503,329, and in Germany December 31, 1929.

The present invention relates to the treatment of ores of certain metals and particularly to the treatment of the ores of tungsten. An object of my improvement is to obtain by a simple and economical process tungsten metal in a shape which is particularly useful in steel making, but may also be employed for other metallurgical purposes.

As a starting material in my process certain ores of tungsten, namely wolframite ($MnFeWO_4$), Hübnerite ($MnWO_4$), or Ferberite ($FeWO_4$), preferably in the form which is known to the trade as "concentrate", are employed. These ores are, in a state of suitable comminution, subjected to the action of a halogen, preferably chlorine, and hydrogen at temperatures above red heat, preferably between 850 and 950° C. It is a particular feature of my process that the hydrogen is employed in large excess over the amount required to combine with the halogen present so as to form hydrochloric acid, the amount of hydrogen being between about three to twelve, and preferably about eight times as large, by volume, as the quantity of halogen employed. This mode of procedure results in that practically all the iron and manganese and other contents of the ore are volatilized in the form of their respective chlorides, whereas the tungsten contained in the ore is reduced and left behind in the metallic form, only contaminated by comparatively small quantities of iron and silicic acid. When obtained in this shape the product may be employed in steel making as such or preferably after briquetting, and also sintering if necessary, as it is free from carbon, and the accompanying substances still contained therein have no detrimental influence upon the steel bath. In any case, any arsenic or tin contained in the ore as well as all the sulphur are volatilized in my process.

Instead of or besides chlorine, also other halogens may be employed, provided they are capable of forming volatile compounds with the metallic compounds contained as impurities in the tungsten ore at the temperature of working. Along with the formation of volatile halogen compounds also such halogen compounds may be formed which can be separated from the remaining metallic tungsten by leaching or draining with water. In cases where it is not essential to obtain a product free from carbon also compounds splitting off hydrogen under the conditions of working such as hydrocarbons may be employed instead of or together with hydrogen. In such cases, chlorination may also be promoted by admixing coke or any other carbonaceous reducing agent with the ore.

For carrying my invention into practice I may employ a furnace of the rotary type which is lined with a highly refractory aluminous material sintered at high temperatures. However, it is equally possible to employ a vessel of heat and chemically resistant steel. The furnace is preferably heated from without and the mixture of gases employed in the reaction is introduced therein with the exclusion of air, in counter-current to the ores to be treated. The raw material is preferably employed in a comminuted form having an average grain-size of about 2400 mesh per square inch.

For the purpose of shortening the duration of the reaction and thus increasing the output, it has also proved advantageous to employ a stationary furnace instead of a furnace of the rotary type, and to subject the raw material to the reaction gases in a series of cup-shaped receptacles arranged within said furnace. However, in this case, so as not to extend the duration of the treatment unduly, it is preferable to maintain a thickness of the layer of raw material under treatment not exceeding about 10 mms.

It has already been proposed (cf. British patent specification No. 176,428) to subject certain tungsten ores, such as wolframite, to the action of a mixture of halogen and hydrogen in about equal parts by volume at temperatures gradually rising from about 450° to 500° C. to from about 700° to 750° C. When subjected to this treatment, however, not only the impurities obtained in the ore such as tin etc. are volatilized, but also the tungsten in form of its chloride, and the prior process therefore contemplates the separate recovery of tungstic oxide from such chloride by a treatment with water. In contradistinction, according to the present process, the content of the reaction gases in hydrogen is raised to such an extent as to largely predominate in the latter, and when carried out under such conditions the reaction results in the complete reduction of any tungsten chloride intermediarily formed, so that metallic tungsten is formed as a final product. In consequence the present process is a one step process and it is not necessary for the purpose of separating the impurities contained in the ore which are volatilizable in the form of their chlorides to consecutively treat the reaction mass at different temperatures corresponding to the volatilization points of the chlorides of the various contaminating metals.

I claim:

1. A process for the production of tungsten metal which comprises causing an ore chiefly consisting of tungstate of iron and manganese to react with a mixture of chlorine and hydrogen, the quantity of hydrogen present in said mixture being between about three and twelve times the quantity required for the formation of hydrochloric acid by combination with the chlorine present.

2. A process for the production of tungsten metal which comprises causing an ore chiefly consisting of tungstate of iron and manganese to react with a mixture of chlorine and hydrogen, the quantity of hydrogen present in said mixture being about eight times the quantity required for the formation of hydrochloric acid by combination with the chlorine present.

3. A process for the production of tungsten metal which comprises causing a concentrated ore chiefly consisting of tungstate of iron and manganese to react with a mixture of chlorine and hydrogen, the quantity of hydrogen present in said mixture being between about three and twelve times the quantity required for the formation of hydrochloric acid by combination with the chlorine present.

4. A process for the production of tungsten metal which comprises causing an ore chiefly consisting of tungstate of iron and manganese to react with a mixture of chlorine and hydrogen at temperatures between about 850 and 950° C., the quantity of hydrogen in the mixture being between about three and twelve times the quantity required for the formation of hydrochloric acid by combination with the chlorine present.

5. A process for the production of tungsten metal which comprises causing a tungsten ore to react with a mixture of chlorine and hydrogen, the quantity of hydrogen present in said mixture being between about three and ten times the quantity required for the formation of hydrochloric acid by combination with the chlorine present.

In testimony whereof, I affix my signature.

ERNST POKORNY.